United States Patent
Richerand

(10) Patent No.: US 9,095,786 B1
(45) Date of Patent: Aug. 4, 2015

(54) METHOD AND APPARATUS FOR SEPARATION OF FLUIDS WITHIN A SINGLE VESSEL

(75) Inventor: Frank A. Richerand, Covington, LA (US)

(73) Assignee: ENVIRO-TECH SYSTEMS, L.L.C., Folsom, LA (US)

(*) Notice: Subject to any disclaimer, the term of this patent is extended or adjusted under 35 U.S.C. 154(b) by 453 days.

(21) Appl. No.: 13/208,852

(22) Filed: Aug. 12, 2011

Related U.S. Application Data

(60) Provisional application No. 61/449,289, filed on Mar. 4, 2011.

(51) Int. Cl.
  C02F 1/24 (2006.01)
  B03D 1/14 (2006.01)
  B03D 1/24 (2006.01)
  B01D 17/02 (2006.01)
  C02F 1/40 (2006.01)
  C02F 103/36 (2006.01)

(52) U.S. Cl.
  CPC .............. *B01D 17/0205* (2013.01); *C02F 1/24* (2013.01); *C02F 1/40* (2013.01); *B01D 17/0211* (2013.01); *B01D 17/0214* (2013.01); *B03D 1/1406* (2013.01); *B03D 1/1456* (2013.01); *B03D 1/1493* (2013.01); *C02F 2103/365* (2013.01)

(58) Field of Classification Search
  CPC ................ C02F 1/24; C02F 1/40; C02F 9/00; B01D 17/0205; B03D 1/1456
  USPC .............. 210/703, 802, 804, 806, 202, 221.2, 210/522, 201, 320
  See application file for complete search history.

(56) References Cited

U.S. PATENT DOCUMENTS

| | | | | |
|---|---|---|---|---|
| 3,773,179 A | * | 11/1973 | Hurst | 210/194 |
| 3,986,954 A | * | 10/1976 | George et al. | 210/706 |
| 4,800,025 A | * | 1/1989 | Bibaeff | 210/703 |
| 4,824,579 A | * | 4/1989 | George | 210/703 |
| 4,935,154 A | * | 6/1990 | Arnold | 210/787 |
| 4,983,287 A | * | 1/1991 | Arnold | 210/259 |
| 5,158,678 A | * | 10/1992 | Broussard, Sr. | 210/221.1 |
| 5,509,535 A | * | 4/1996 | Schneider | 209/169 |
| 5,814,229 A | * | 9/1998 | Lygren | 210/703 |

* cited by examiner

*Primary Examiner* — Thomas M Lithgow
(74) *Attorney, Agent, or Firm* — Garvey, Smith, Nehrbass & North, L.L.C.; Gregory C. Smith; Julia M. FitzPatrick

(57) ABSTRACT

A process wherein a combination of two separation principles are combined into one space saving machine with portability to separate two distinct and different fluids one lighter in specific gravity than the other, including the steps of primary separation of fluids allowing for free and suspended solids along with free oil and grease to be removed in the primary separation chamber; utilizing parallel corrugated plates in the separation defining the distance of rise for a given oil droplet based on Stokes Law to remove the remaining large droplets of free oil and solids; and providing an induced gas flotation process which provides a finely dispersed bubble in the liquid to accelerate the lift necessary for separation of fine oil droplets, emulsified oil droplet, and suspended solids to meet a government discharge regulation. This combined technique can be configured in a single vessel without pumps or other methods of liquid movement.

4 Claims, 7 Drawing Sheets

COMBO PLAN VIEW
SCALE: N.T.S.

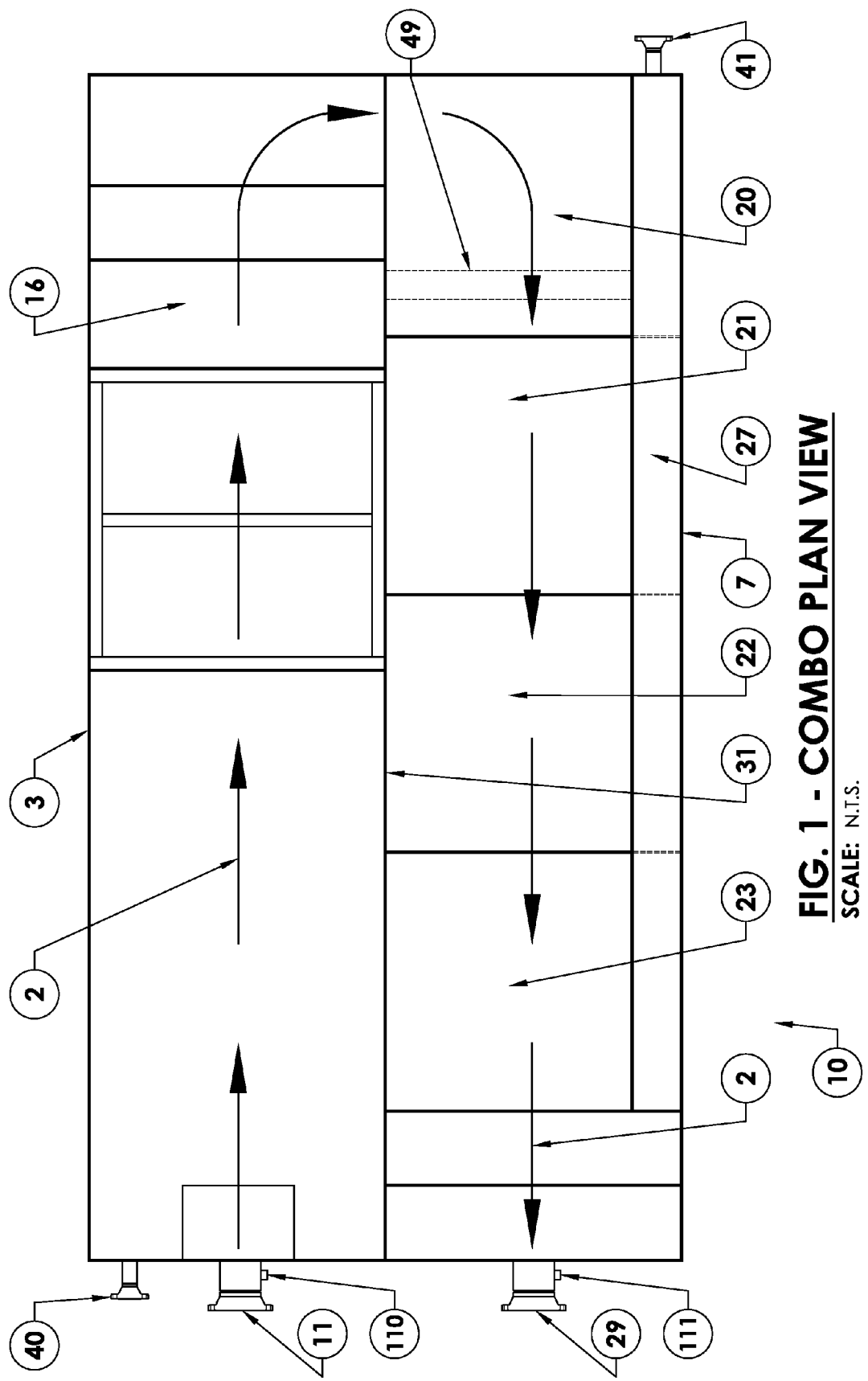

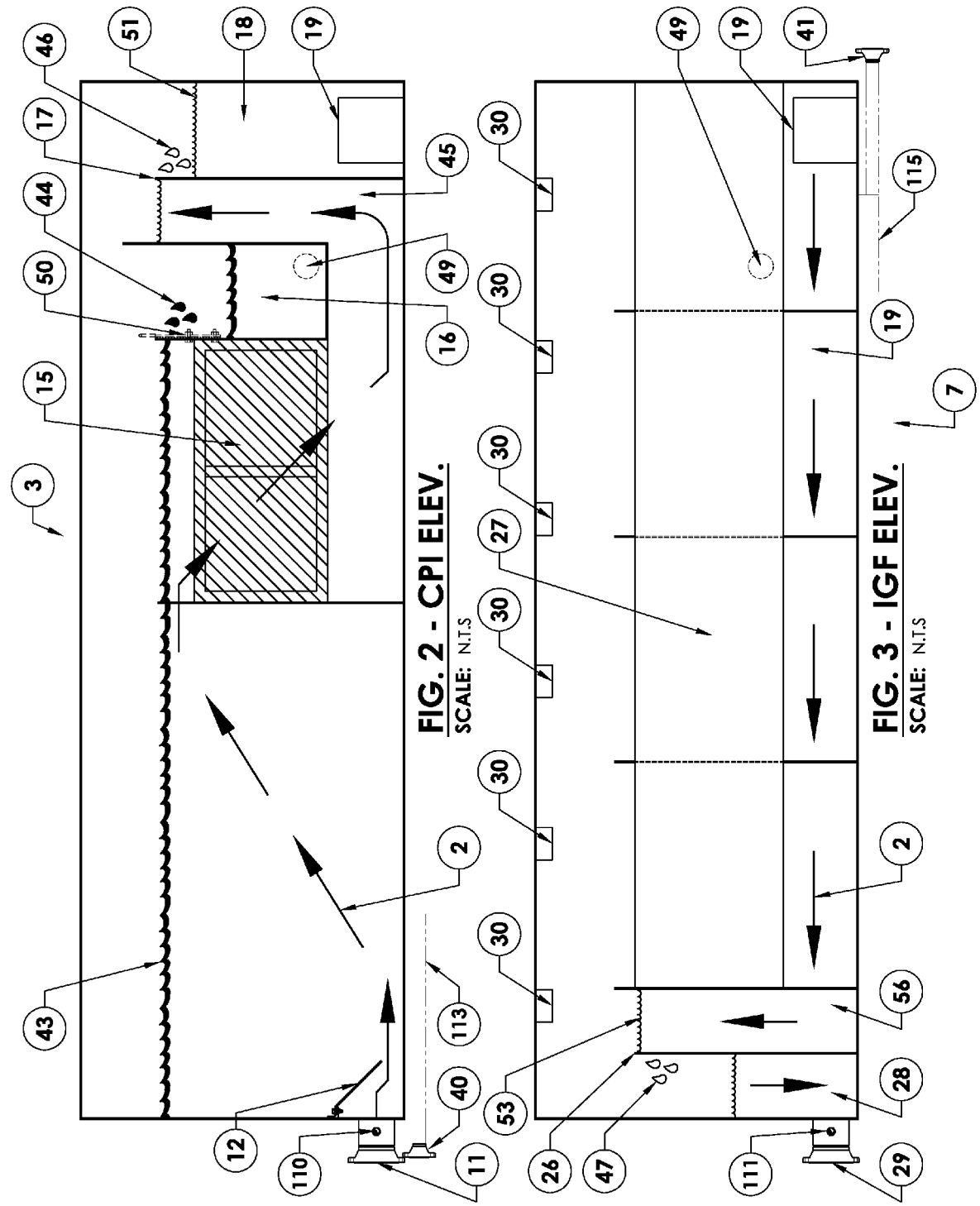

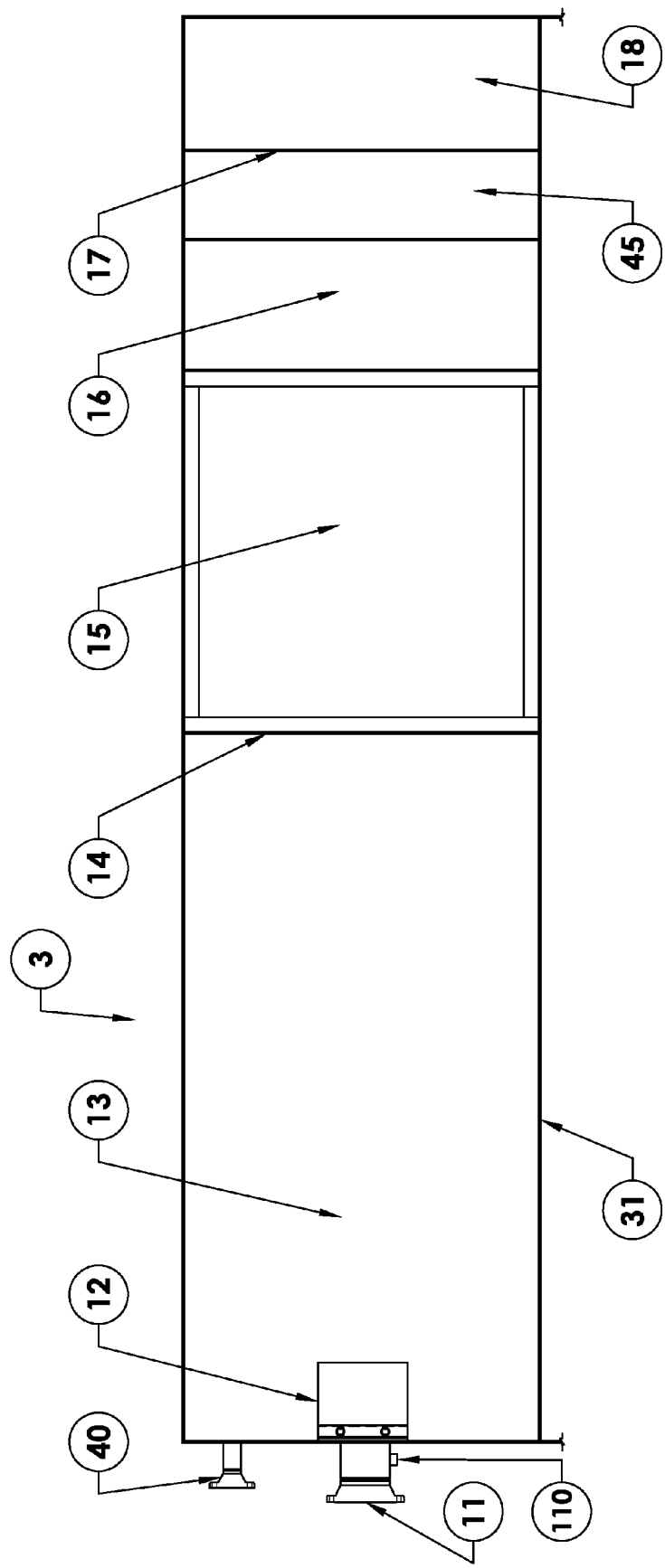

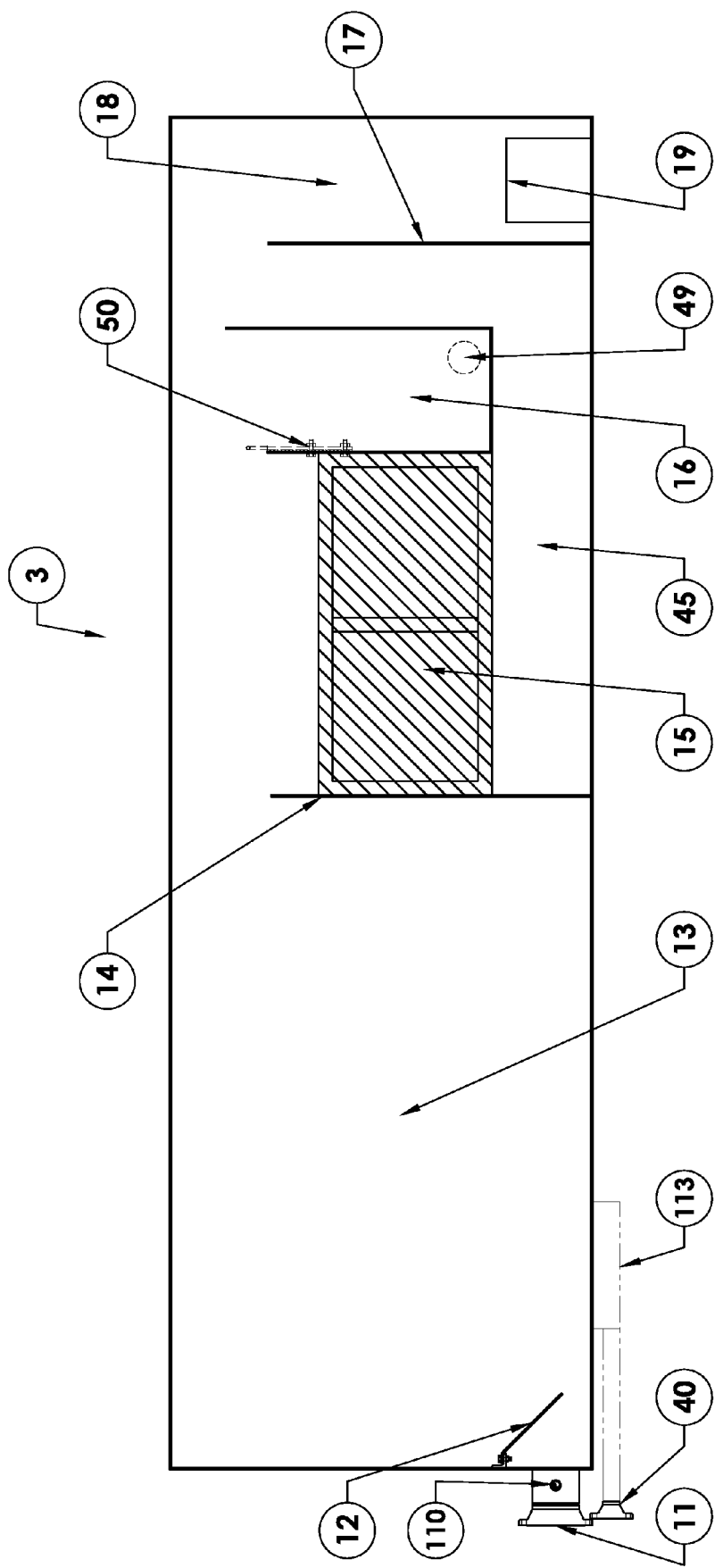
FIG. 5 - CPI ELEV.
SCALE: N.T.S

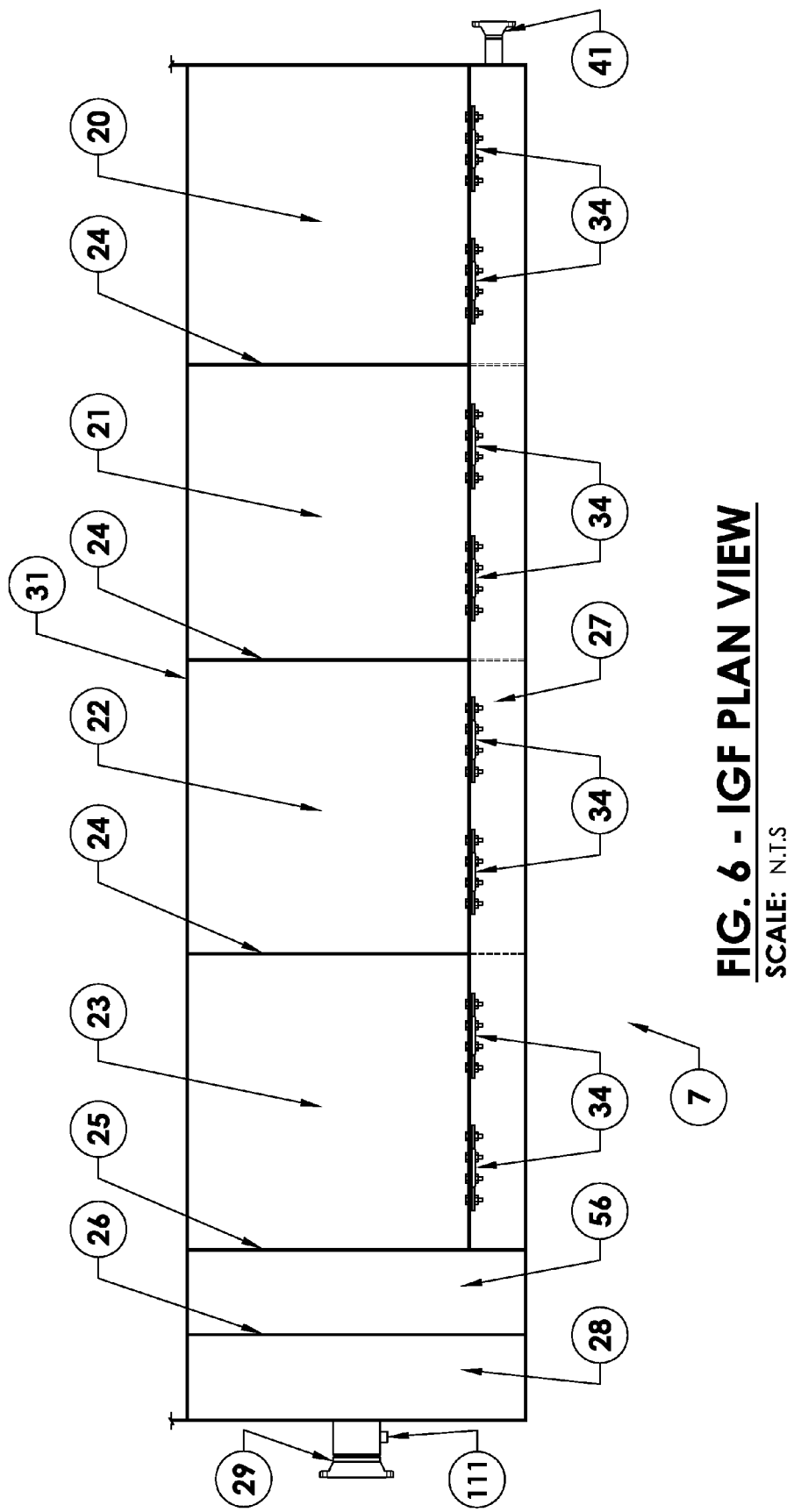
FIG. 6 - IGF PLAN VIEW
SCALE: N.T.S

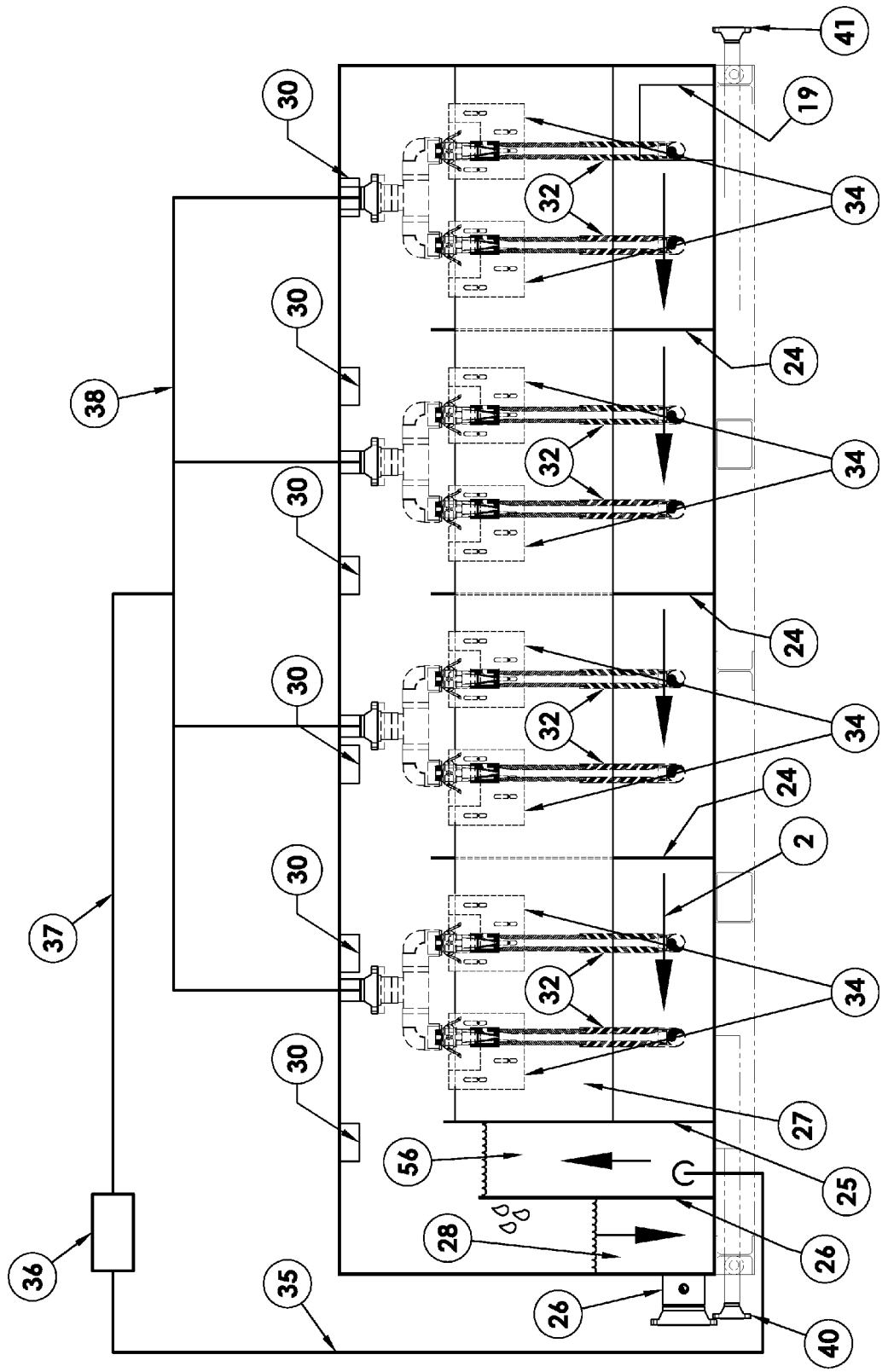
FIG. 7 - IGF ELEV.
SCALE: N.T.S

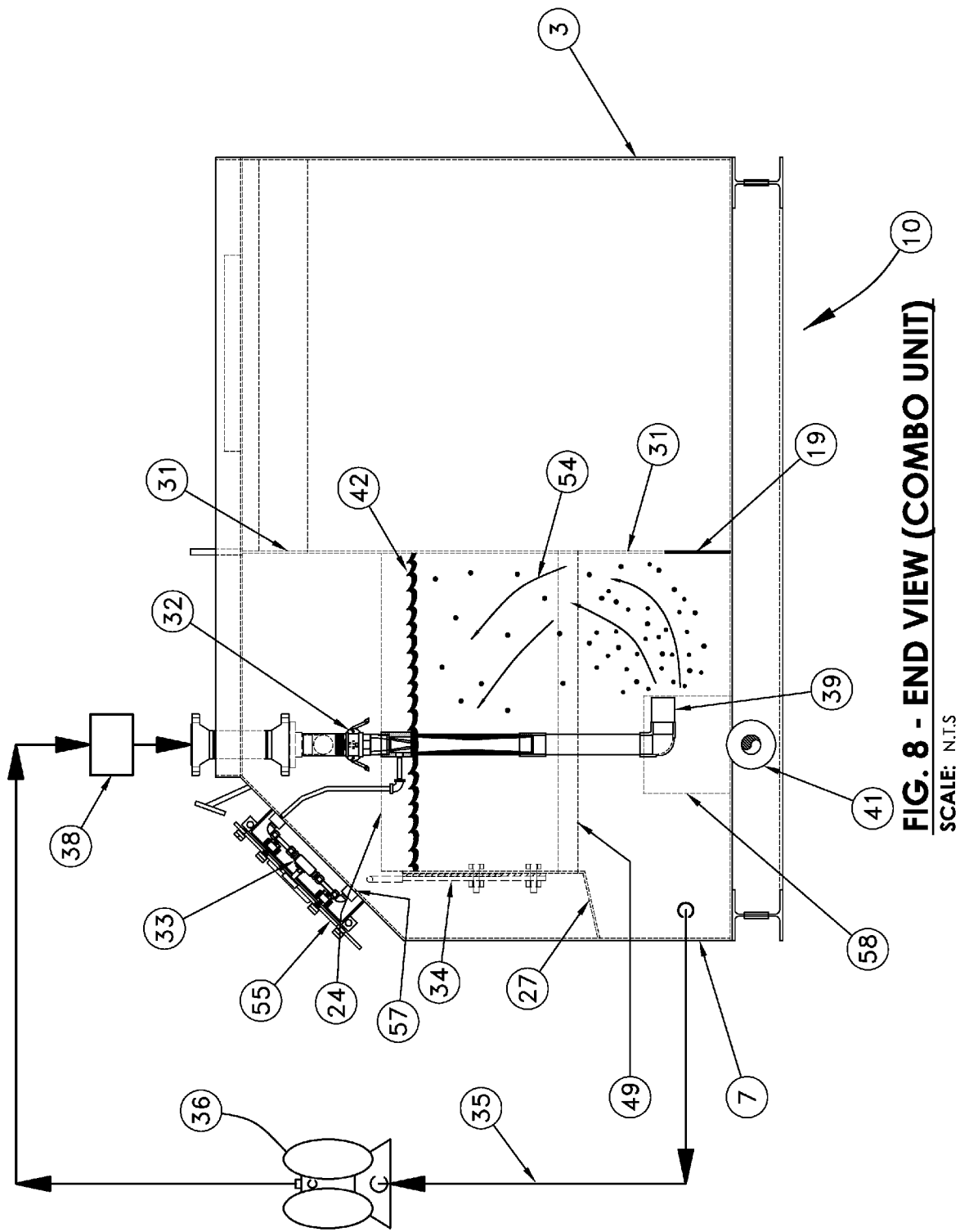

METHOD AND APPARATUS FOR SEPARATION OF FLUIDS WITHIN A SINGLE VESSEL

CROSS-REFERENCE TO RELATED APPLICATIONS

Priority of U.S. Provisional Patent Application Ser. No. 61/449,289, filed Mar. 4, 2011, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to separation of fluids. More particularly, the present invention relates to a method for the separation of two liquids which are immiscible with each other. Still more particularly the present invention discloses a method and an apparatus for separating oil from water efficiently within a single vessel by applying a separating influence and minimizing other factors which tend to reduce droplet size and inhibit separation.

2. General Background of the Invention

In the present state of the art, the separation of two distinct fluids is undertaken in separate operations, which requires additional space, increases the cost and operating expense of having two machines for this operation, and does not allow the equipment to become portable, since these technologies are being operated separately for all of the above applications.

BRIEF SUMMARY OF THE INVENTION

The process and apparatus of the present invention solves the problems in the prior art in that it provides a process wherein a combination of two separation principles are combined into one space saving machine with portability to separate two distinct and different fluids one lighter in specific gravity than the other, including the steps of primary separation of fluids allowing for free and suspended solids along with free oil and grease to be removed in the primary separation chamber; utilizing parallel corrugated plates in the separation defining the distance of rise for a given oil droplet based on Stokes Law to remove the remaining large droplets of free oil and solids; and providing an induced gas flotation process which provides a finely dispersed bubble in the liquid to accelerate the lift necessary for separation of fine oil droplets, emulsified oil droplet, and suspended solids to meet governmental discharge regulations. This combined technique can be configured in a single vessel with the proper flow regime and unique hydraulic condition for undisturbed flow throughout the vessel without the use of pumps or other methods of liquid movement solely thru a specified pressure drop internal to the vessel.

Therefore, it is a principal object of the present invention wherein the combination of these two technologies in one vessel benefits the user in that it minimizes the cost and operating expense of having two machines for this operation.

It is a further object of the present invention whereby the combination provides a space savings over the current technology.

It is a further object of the present invention whereby the combination makes the equipment portable and therefore can be applied in several ways, primarily as process water treatment equipment, but also for using as equipment bypass treatment while existing equipment is being maintained and finally for pipeline flushes and cleaning and frac water treatment.

It is a further object of the present invention to provide a significant benefit to the state of the art when one considers that to this date all applications of these two techniques have been done in separate and individual equipments while taking up additional space, and having a significantly higher cost, considering the fact there is more equipment, maintenance and instrumentation.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates a schematic plan view of the present invention;

FIG. 2 illustrates a schematic side elevation view of corrugated plate interceptor (CPI) compartmental vessel of the apparatus of the present invention;

FIG. 3 illustrates a schematic side elevation view of the Induced Gas Flotation (IGF) compartmental vessel of the apparatus of the present invention;

FIG. 4 illustrates a schematic plan view of the corrugated plate interceptor (CPI) compartmental vessel of the apparatus of the present invention;

FIG. 5 illustrates a schematic side elevation view of the corrugated plate interceptor (CPI) compartmental vessel of the apparatus shown in FIG. 4; and FIG. 6 illustrates a basic schematic plan view of the induced gas flotation (IGF) compartmental vessel of the apparatus of the present invention;

FIG. 7 illustrates a detailed schematic side elevation view of Induced gas flotation (IGF) compartmental vessel of the apparatus of the present invention; and FIG. 8 schematically illustrates an end elevation view of the composite Enviro-Cell-Combo, comprising the corrugated plate interceptor (CPI), the compartmental vessel, and the induced gas flotation (IGF) compartmental vessel of the present invention.

DETAILED DESCRIPTION OF THE INVENTION

FIG. 1 illustrates a schematic plan view of the present invention, Enviro-Cell-Combo apparatus 10 of the present invention. Enviro-Cell apparatus 10 utilizes an immiscible fluids separation method, incorporating a Corrugated Plate Interceptor (CPI) compartmental vessel 3 conjoint with an Induced Gas Flotation (IGF) compartmental vessel 7 at CPI/IGF process separation partition 31. Schematically illustrated by the immiscible fluid primary flow path 2, the raw immiscible fluid to be separated enters the present invention at immiscible fluid inlet flange 11, the fluid proceeding subsequently through the separation method of Enviro-Cell-Combo 10, and finally a recovered portion of the process fluid (typically water) exiting the invention at clean water outlet flange 29. Oil separated during the initial phase of the immiscible fluids separation process is collected in oil collection reservoir (CPI) 16. In like manner, oil separated during the final phase of the immiscible fluids separation process is collected in oil reservoir (IGF) 27. Oil collection reservoir 16 is connected to oil collection reservoir 27 by means of CPI/IGF collected oil reservoir conduit 49. The oil collection in oil collection reservoir (IGF) 27 is the aggregate product of oil separated by IGF processing cell #1 20, IGF processing cell #2 21, IGF processing cell #3 22, and IGF processing cell #4 23. Waste settlement portions of the raw fluid processed by Corrugated Plate Interceptor (CPI) compartmental vessel 3 and induced gas flotation subassembly (IGF) 7 are extracted through first (CPI) drain 40 and second (IGF) drain 41, both of which can be utilized to empty the apparatus of all fluids. Sampling of the raw unprocessed fluid and the processed fluid may be performed at sample connection for inlet 110 and sample connection for outlet 111.

FIG. 2 illustrates a schematic side elevation view of corrugated plate interceptor (CPI) compartmental vessel 3, schematically illustrating the immiscible fluid primary flow path 2 of the raw, contaminated fluid to be processed. Entering by means of the immiscible fluids inlet flange 11, a portion of the raw fluid quickly floats to the surface of the inflow as surface oil 43, the remaining fluid flows to a corrugated plate interceptor pack 15. Removable distribution baffle 12 reduces possible surge pressures from the incoming immiscible fluid. Surface oil 43 and additional oil extracted by corrugated plate interceptor pack 15 both pass into a receptacle for collected oil, oil collection reservoir 16, poring over first adjustable skim weir 50 as surface oil water weir discharge 44. Processed water passing through corrugated plate interceptor pack 15 accumulates in processed fluid compartment (CPI) 45. This process water wells up and passes over first fixed water spill over weir (CPI) 17 as process water weir discharge #1 46, the discharge creating CPI process weir discharged water level 51, the discharge flowing from CPI to IGF transfer chamber 18, which in turn, flows through CPI/IGF transfer conduit 19. Primary solids collection 113, in conjunction with first (CPI) drain 40, provides a means for draining fluid and debris from corrugated plate interceptor (CPI) compartmental vessel 3. Sample collection for inlet 110 can be used to sample the input fluid.

FIG. 3 illustrates a schematic side elevation view of the Induced Gas Flotation (IGF) compartmental vessel 7 schematically depicting the immiscible fluid primary flow path 2 as the fluid passes through CPI/IGF transfer conduit into the conjoint induced gas flotation (IGF) compartmental vessel 7. The finished process fluid (typically water) accumulates in recirculation cell 56, the accumulated water having an IGF process weir discharged water level 53. Water level 53 increases during fluid processing and subsequently flows over second fixed water spillover weir (IGF) 26 as process water weir discharge #2 47 into collected quiescent cell 28. Collected quiescent cell 28 is discharged via clean water outlet flange 29. Sampling of collected quiescent cell 28 is available by means of sample collection for outlet 111. Secondary solids collection 115, in conjunction with the second (IGF) as drain 41, can be utilized to draw off undesirable constituents of the processed fluid and may also be used to empty all fluids from the induced gas flotation (IGF) compartmental vessel 7. Oil collected in corrugated plate interceptor (CPI), compartmental vessel 3 passes into oil collection reservoir (IGF) 27 via CPI/IGF collected oil reservoir conduit 49. A common air pressure is maintained between corrugated plate interceptor (CPI) compartmental vessel 3 and induced gas flotation (IGF) compartmental vessel 7 by means of air equalization ports 30.

Each of the induced gas flotation (IGF) processing compartments features an IGF cell separation baffle channel 58 to expeditiously maintain fluid circulated within the induced gas flotation (IGF) compartmental vessel 7.

FIG. 4 illustrates a schematic plan view of the corrugated plate interceptor (CPI) compartmental vessel 3 in more detail, showing the immiscible fluid inlet flange 11, sample connection for inlet 110, removable distribution baffle 12, inlet compartment 13, primary separation baffle plate 14, corrugated plate interceptor pack 15, oil collection reservoir (CPI) 16, processed fluid compartment (CPI) 45, first fixed water spillover weir 17, CPI to IGF transfer chamber 18, and common to both corrugated plate interceptor (CPI) compartmental vessel 3 and induced gas flotation (IGF) compartmental vessel 7, the CPI/IGF process separation partition 31. Also schematically illustrated is first (CPI) drain 40.

FIG. 5 illustrates a schematic side elevation view of the corrugated plate interceptor (CPI) compartmental vessel 3, illustrating some of its more important components. Raw immiscible fluid (generally oil and water) enters subassembly 3 at immiscible fluids inlet flange 11, flowing against removable distribution baffle 12 and accumulates in the inlet compartment 13 and can be removed via primary solids collection 113 in conjunction with first (CPI) drain 40. The inflowing raw immiscible fluids fills inlet compartment 13 until it overflows primary separation plate 14 to be processed by corrugated plate interceptor pack 15. Oil floating to the surface as a result of processing by interceptor pack 15 escapes over adjustable oil spillover weir 116 (50), falling into oil collection reservoir (CPI) 16. Collection reservoir 16 is in communication with CPI/IGF collected oil reservoir conduit 49. Water processed by interceptor pack 15 flows through processed fluid compartment (CPI) 45 and subsequently wells up and overflows first fixed water spillover weir (CPI) 17, the processed water spilling into the CPI to IGF transfer chamber 18, that water in turn, flowing through CPI/IGF transfer conduit 19. Sampling of the immiscible fluid can be obtained at sample connection for inlet 110.

FIG. 6 illustrates a basic schematic plan view of the induced gas flotation (IGF) compartmental vessel 7. Partially processed fluid from corrugated plate interceptor (CPI) compartmental vessel 3 (shown in FIG. 5), via CPI/IGF transfer conduit 19, enters the IGF processing cell #1 20. The fluid then flows, in turn, through IGF processing cell #2 21, IGF processing cell #3 22, IGF processing cell #4 23 by means of the IGF cell separation baffle channel 58. The fluid then enters the recirculation cell 56 wells up and overflows the quiescent cell partition 26 and collects in the quiescent cell 28. The remaining cleaned fluid is then DISCHARGED through clean water outlet flange 29. Sampling of the clarified process fluid (typically water) is available at sample connection for outlet 111. A portion of the fluid collected in the recirculation cell 56 is pumped by the recirculation pump 36 (See FIG. 7) through or into the recirculation header 38 (See FIG. 7) and equally distributed to the four (4) eductor discharge pipes 32 (See FIG. 7). The distributed clean water flows under pressure into each eductor for mixing with the blanket gas or other inert gas to create the fine bubble for oil particle removal. Each eductor has an adjustable valve 33 (See FIG. 7) to regulate the mixture of gas and liquid to create the bubbles. Bubbles eject through the bottom of each eductor 39 (See FIG. 8) and rise to the surface attaching to suspended or free oil droplets thus bringing them to a collection point for removal. The separated oil forms a skim that flows over individual adjustable oil spillover weirs 34 and into oil collection reservoir (IGF) 27. This collected oil, along with the oil collected from oil collection reservoir (CPI) 16 by means of oil transfer piping 49, can be sent for further processing.

The four (4) IGF processing cells are located adjacent to CPI/IGF process separation partition 31 and are separated from each other by an IGF separation baffle 24. IGF processing cell #4 23 is separated from recirculation cell 56 by IGF separation end plate 25. Waste material accumulating at the bottom of induced gas flotation compartmental vessel 7 can be withdrawn by means of IGF drain 41.

FIG. 7 presents a more detailed schematic side elevation view of Induced gas flotation (IGF) compartmental vessel 7, illustrating the incorporation of a dual eductor 32 in each of the four (4) IGF processing cells. The four (4) IGF processing cells are partitioned from each other by IGF separation plate 24 and IGF separation plate 25. Each of the four (4) dual eductors features an air mixing valve 33. Pump suction piping 35 connects recirculation cell 56 to the input for the recirculation pump 36. The output of recirculation pump 36 is connected to pumps discharge manifold 38 by means of pump discharge piping 37. Air pressure within induced gas compartmental vessel 7 is equalized by means of multiple air equalization ports 30. Each of the four (4) IGF processing cells is in communication with oil collection reservoir (IGF) 27. Oil collected in both oil collection reservoir (IGF) 27 and oil collection reservoir (CPI 16, (shown in FIG. 5) is drawn off by means of a common drain via CPI/IGF collected oil reservoir conduit 49. Immiscible fluid primary flow path 2 is schematically depicted by the large arrows, the immiscible fluid flowing through CPI/IGF transfer conduit 19. Conduit 19 pierces CPI/IGF process separation partition 31 to provide fluid communication between corrugated plate interceptor (CPI) compartmental vessel 3 and induced gas flotation (IGF) compartmental vessel 7. As schematically illustrated by immiscible primary fluids flow path 2, the processed fluid enters recirculation cell 56 welling up and overflowing quiescent cell partition 26. Upon overflowing quiescent cell partition 26, processed water (typically water) accumulates in quiescent cell 28, where it can be withdrawn through clean water outlet flange 29. Debris and waste products resulting from processing by the induced gas flotation (IGF) compartmental vessel 7 can be removed by means of second (IGF) drain 41.

FIG. 8 schematically depicts an end elevation view of the preferred embodiment of the present invention, Enviro-Cell-Combo 10, comprising both corrugated plate interceptor (CPI) compartmental vessel 3 and induced gas flotation (IGF) compartmental vessel 7. Piercing CPI/IGF process separation baffle 31, CPI/IGF transfer conduit 19 provides processed fluids communication between vessel 3 and vessel 7, conduit 19 linking the CPI/IGF transfer chamber 18, in similar manner, piercing, CPI/IGF process separation partition 31, CPI/IGF collected oil reservoir conduit 49 provided oil collection communication between vessel 3 and vessel 7, conduit 49 linking to oil collection reservoir (IGF) 27. A portion of the fluid that is to be additionally processed is pumped into the pump discharge manifold 38, hence to a dual eductor 32, one (1) each in each of the four (4) IGF processing cells. Each dual eductor 32 features an air mixing valve 33, controlling a source of gas injection port 57. The fluid to be additionally processed is combined with a controlled gas injection, the combination ejected from eductor nozzle 39 of each of the four (4) partitioned IGF processing cells. The eductor nozzle 39, of each of the four (4) dual eductors 32 is positioned to create IGF processing cell counterclockwise fluid circulation 54 in the vertical plane of the fluid processed and accumulated in each of the four (4) partitioned IGF processing cells. This clockwise rotation as shown in FIG. 8 migrates the collected oil skim to the pair of individually adjustable oil spillover weirs (IGF 34 adjustable oil weir. The level of the process and accumulated fluid, IGF processing cell fluid level 42 increases during processing until the released surface oil overflows a pair of individually adjustable oil spillover weirs (IGF) 34 in each of the four (4) IGF processing cells, the spillover oil dropping into oil collection reservoir (IGF) 27. An access port 55 is provided for each of the four (4) IGF processing cells, allowing for inspection and routine maintenance.

PARTS LIST

The following is a list of suitable parts and materials for the various elements of the preferred embodiment of the present invention.

| Part No. | Description |
| --- | --- |
| 2 | flow path |
| 3 | (CPI) vessel |
| 7 | (IGF) compartmental vessel |
| 10 | enviro-cell combo |
| 11 | method |
| 11 | fluid inlet flange |
| 12 | baffle |
| 13 | inlet compartment |
| 14 | baffle plate |
| 15 | interceptor pack |
| 16 | oil collection reservoir (CPI) |
| 17 | water spillable weir |
| 18 | IGF transfer chamber |
| 19 | CPI/IGF transfer conduit |
| 20 | IGF processing cell #1 |
| 21 | IGF processing cell #2 |
| 22 | IGF processing cell #3 |
| 23 | IGF processing cell #4 |
| 25 | plate |
| 26 | spillover weir IFG |
| 27 | oil reservoir (IGF) |
| 28 | quiescent cell |
| 29 | water outlet flange |
| 30 | air equalization ports |
| 31 | separation partition |
| 32 | discharge pipes |
| 33 | adjustable valve |
| 34 | spillable weirs |
| 35 | pump suction piping |
| 36 | recirculation pump |
| 37 | discharge piping |
| 38 | circulation header |
| 39 | eductor |
| 40 | (CPI) drain |
| 41 | (IGF) drain |
| 43 | subsurface oil |
| 44 | oil water weir discharge |
| 45 | processed fluid compartment (CPI) |
| 46 | water weir discharge #1 |
| 49 | oil reservoir conduit |
| 50 | skim weir |
| 51 | discharge water level |
| 53 | water level |
| 56 | recirculation cell |
| 57 | gas injection port |
| 58 | baffle channel |
| 110 | inlet |
| 111 | outlet |
| 113 | primary solids collection |
| 115 | secondary solids collection |
| 146 | water weir discharge |
| 247 | discharge |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of separating two fluids, one lighter in specific gravity than the other, comprising the following steps:
   providing a single vessel, having a primary separation chamber and a gas flotation chamber and a conduit for providing flow from the primary separation chamber to the gas flotation chamber;
   flowing fluids into the primary separation chamber of the vessel;
   separating free and suspended solids, including free oil, grease and gas, from the fluids by utilizing parallel corrugated plates in the primary separation chamber for defining the distance of rise for a given oil droplet to remove the remaining smaller droplets of free oil and solids from the fluids;
   flowing the fluids from the primary separation chamber into the gas flotation chamber and inducing gas into the fluids to provide a finely dispersed bubble in the fluids to accelerate the lift necessary for separation of fine oil droplets, emulsified oil droplets, and suspended solids;
   creating a rotation of gas introduced into the fluids to move the separated fine oil droplets, emulsified oil droplets, and suspended solids to a spillover point in the gas flotation chamber for collection;
   flowing fluid that has been processed through the vessel through an outlet of the gas flotation chamber; and
   wherein fluid flow into and through the primary separation chamber flows in a direction counter to the flow of fluid through the gas flotation chamber to the outlet.

2. The method in claim 1, wherein the process within the single vessel provides the proper flow regime and unique hydraulic condition for undisturbed flow throughout the vessel, into and from the primary separation chamber to the gas flotation chamber to the outlet thru a specified pressure drop internal to the vessel.

3. The method in claim 1, further comprising the step of flowing the gas through the fluid in a counter clockwise direction so that smaller oil droplets are collected from the fluid and rise to the top of the fluid, to further clean the fluid.

4. The method in claim 3, wherein the fluid is then pumped into one or more eductors for further mixing with the gas and for circulating back into the processing cells, for more oil removal from the fluid.

* * * * *